ANALOG TO DIGITAL CONVERTER
Filed Aug. 6, 1959
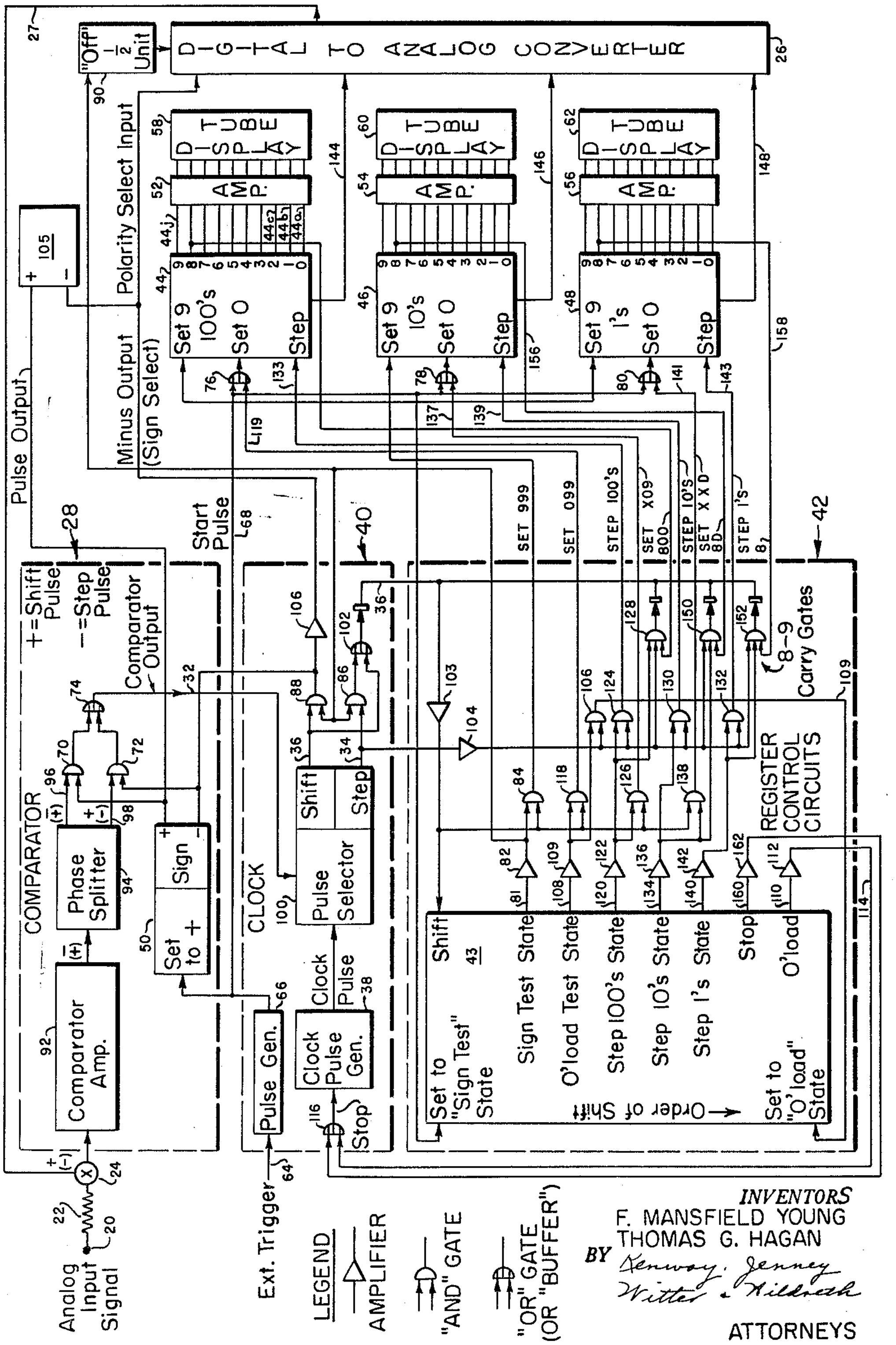
INVENTORS
F. MANSFIELD YOUNG
THOMAS G. HAGAN
BY Kenway, Jenney, Witter & Hildreth
ATTORNEYS United States Patent Office 3,052,880
Patented Sept. 4, 1962

3,052,880
ANALOG TO DIGITAL CONVERTER

Frink Mansfield Young, Boston, and Thomas G. Hagan, Brookline, Mass., assignors to Adage, Inc., Cambridge, Mass., a corporation of Massachusetts Filed Aug. 6, 1959, Ser. No. 832,039
20 Claims. (Cl. 340—347)

Our invention relates to an improved device for providing a digital indication of the magnitude of an electrical signal which is in analog form. Devices of this nature are called analog to digital converters. Our converter is of the so-called programmed feedback type. More specifically our invention relates to a bi-polar analog to digital converter, providing a decimal indication of the value of the analog signal which is converted and also providing for automatic overload testing before each conversion is accomplished.

Analog to digital converters of the programmed feedback type have heretofore been known. In converters of this type a bank of flip-flops is usually provided in which the present count of the converter is stored. This count is converted to an analog signal, or is used to control a standard voltage to generate a feedback signal. This feedback signal is compared with the analog input signal and the polarity of the difference signal is used, in conjunction with logical circuitry to change the count in the register to make the difference signal be zero.

The programmed feedback analog to digital converters heretofore used have in general been of two types known generally as the "continuous type" and the "digit-at-a-time type." A description of both of these types of converters is given in U.S. Patent No. 2,784,396, issued March 5, 1957 to Kaiser et al., and a more complete description of the continuous type of converter is given in U.S. Patent No. 2,539,623, issued January 30, 1951 to Heising. In the continuous type of converter heretofore used the difference signal is used to vary the count in a counter until the feedback and analog input signals are equal. Once this condition is reached, the counter follows variations in the input voltage. The principal advantage of this type of circuit is that it uses an ordinary counter, and not flip-flops, and accordingly a minimum of conversion equipment is required to convert the stored signal to a decimal or octal system. However, to achieve the initial state where the counter reads correctly the analog input signal at least $2^{n-1}$ counts are required, $n$ being the number of binary digits needed to represent the analog signal. If multiple analog input signals are present, and the converter is to be switched among them, then the so-called "continuous" converter is too slow.

In the digit-at-a-time converter, such as is disclosed in the Kaiser patent cited above, the analog signal is converted to its binary digital equivalent one digit at a time, usually beginning with the most significant binary digit and an analog signal corresponding to the binary number stored in the register is compared to the input signal. After the final binary digit has been set, the count in the register is read, and the next conversion is begun. In general, this type of conversion has a much higher speed than the "continuous" type, but requires both considerable equipment to implement the logical circuitry for setting the storage register, and if other than a binary output is desired, considerable equipment complexity to decode the binary signal to a decimal or octal system.

In converters made according to our invention, we convert the input signal one digit at a time; however we provide a conventional counter for each output digit. These counters may use flip-flops, but may also, for example be counters such as stepping switches, beam switching tubes or indeed any counter capable of counting in the numbering system desired. In converters made according to our invention the digits are formed, one digit at a time, the most significant digit first, with all the counters associated with less significant digits being held at their maximum value during the setting of more significant digits. Counters made according to our invention may require a longer time to convert a signal than the converters which use a bank of flip-flops and set them in sequence, but will generally not require a period as long as the continuous type of converter. Additionally converters made according to our invention generally require much less logical circuitry than counters heretofore used, and also require essentially no output circuitry when a counter which counts in the number base in which the output is desired is associated with each output digit.

In the present application we have disclosed an analog to digital converter using counters for each digit which count from 0 to 9 i.e. an analog to decimal digit converter. It is to be understood of course the counters using other number bases i.e. octal or scale of 12 might be used by using 8 or 12 state counters.

Heretofore analog to digital converters have generally been constructed to handle negative input signals by offsetting the negative analog input signal by a fixed amount so that it becomes positive and reading the complement of the register signal obtained by conversion of the positive signal. Thus, if the analog signal is −0.7 volt, and the converter is designed to have a 1 volt full scale reading, a positive 1 volt signal is added to the negative analog signal to provide an input signal of +0.3 volt. This analog signal is converted in the usual fashion. However, the output of the register cannot be read directly, instead, its complement i.e. $1-0.3=0.7$, must be read in order to obtain the correct magnitude of the input signal.

While schemes of this sort have previously been used for analog to digital converters, they have generally been unsatisfactory for two reasons. The equipment required to convert the complement is in general complex and adds substantially to the expense of the unit. A further problem is drift in the value of the offsetting voltage. The offsetting voltage is outside the feedback loop described and accordingly there is no system compensation for drift therein.

Our device avoids these problems, and in addition is bi-polar i.e. utilizes the same circuits without offsetting to count "up" to a positive value or "down" to a negative value depending upon the sign of the input signal. In our converter, this is accomplished by initially setting the converter digital storage register to zero and the converter for positive signals. If the analog signal is in fact positive, then the analog signal will be greater than the number stored in the register and normal operation will take place. If, however, the analog signal is negative, then a control or "shift" signal is generated, which resets the entire converter to a negative signal basis, and operation then continues normally.

Another problem that has been encountered in the past with analog to digital converters of this type is that of converting analog signals that are larger in amplitude than the full scale of the converter. In such situations the signal stored in the digital register can never be equal to or larger than the analog signal. Hence the converter will never reach a condition where the conversion has been completed.

This problem has previously been met by limiting the size of the input signal; however the attenuation may result in erroneous readings of signals which are within the converter range and are therefore undesirable. Also, if the converter is giving a reading equal to its full scale value, it cannot be determined whether this is the result of an overload condition, or is in fact the actual value of the analog input signal. In the improved analog to digital computer made according to our invention, a test for overload is made prior to the beginning of the conversion. If the analog signal is larger than the largest possible number which can be stored in the digital register, no conversion is attempted and an overload condition is indicated. Thus the digital output indication can always be relied upon and input attenuators or limiters are unnecessary. Also, if the signal is in fact not within the conversion range of the converter preventing needless conversion saves a substantial amount of time, which otherwise would be uselessly expended.

As previously mentioned, analog to digital converters made according to our invention utilize a counter associated with each digit. The use of these counters provides output signals which may be used with a minimum amount of circuitry to provide a convenient decimal, octal or other indication of the amplitude of the analog signal. One of the problems encountered when counters are associated with each digit is the fact that the input analog signal may change in value during the conversion process. If the signal were initially, for example, 0.699 volt and it changed after the first digit, 0.6XX, had been determined to 0.700 volt, the signal ultimately stored in the decimal digital counters could never be greater than 0.699 if three counters were used. Hence the signal from the digital to analog converter associated with the digital register would never be equal to or larger than the input analog signal. Therefore, the analog signal representative of the stored number would never be equal to the input analog signal, and the converter would not be given sufficient information to determine that the conversion should end. To overcome this problem we provide apparatus which generates a "shift" signal whenever any of the counters steps from an "8" to a "9." Thus, in the case described a "shift" signal would be generated as each of the last two digits "0.X9X" and "0.XX9" were generated, the "step" signal from the last digit ending the conversion. Thus the resultant signal indicated by the analog to digital converter will be 0.699, which was the initial value of the analog signal, and the converter is then ready to make a further conversion. While we have discussed this problem in connection with a change in value of the analog signal, noise in the converter may cause a similar effect, especially where the value of the analog signal is close to a "carry" i.e. includes a "9" as one of its digits.

From the foregoing it will be seen that the principal object of our invention is to provide an improved analog to digital converter in which a counter, counting in the number base of the desired output signal is provided for each output digit desired. A more specific object of our invention is to provide an improved analog to digital converter of the type described which tests for overload prior to beginning a conversion and if an overload is present, stops the operation of the device. A still further object of our invention is to provide an analog to digital converter of the type described which utilizes decimal digital counters with their attendant advantages and circuit simplication. Another object of our invention is to provide an analog to digital converter of the type described which will complete a conversion despite an increase in the absolute value of the analog signal during conversion. A still further object of our invention is to provide an analog to digital converter capable of high speed operation. Yet a further object of our invention is to provide an analog to digital converter of the type described which is relatively simple in construction and operation. Other and further objects of our invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is a generalized block diagram of an analog to digital converter made according to our invention.

The analog to digital converter illustrated in the single FIGURE of the drawing by way of example has a three decimal digit output display. It is to be understood of course that an output signal may be provided in binary form or in any other numerical form which is most convenient and desirable for the particular application of the converter by changing the number base of the counters used therein.

Before we attempt to describe in detail the structure and operation of our improved analog to digital converter, we provide an introductory description to explain the general construction and operation of our device. Following this introduction, the particular apparatus and its operation to perform each of the desired function is described.

It is important to note that the invention described herein resides in the logical arrangement of various known circuit elements such as amplifiers, gate circuits, flip-flops and registers to provide the functions described. Since these circuit elements are well known, no specific circuitry has been illustrated for each element. In connection with our invention described herein, certain improved circuit elements have been developed, and we prefer these improved elements for use in connection with our invention. These improved elements are disclosed and claimed in certain copending patent applications and will be referred to herein as appropriate. However, it is to be understood that conventional circuit elements of well known types could be used to perform all the functions herein illustrated, and an analog to digital converter so constructed would secure the advantages of our invention.

I.—INTRODUCTION

As shown in the drawing the analog input voltage to be measured in connected to the terminal 20 and from there by a resistor 22 to the error point 24. The output of the digital to analog converter 26 associated with the digital register forming a part of the converter is also connected to the error point 24 via lead 27 and the difference signal developed at the error point is fed to the comparator circuit generally indicated at 28.

In the embodiment of our analog to digital converter here illustrated, the comparator output signal is a voltage appearing on lead 32 whose polarity is used to determine on which of two leads 34 or 36 pulses generated by a clock pulse generator 38, which is a part of the clock 40 will appear. The clock pulse generator may be any of several well known circuits for generating a pulse train. When the polarity of the voltage appearing on lead 32 from the comparator is negative, indicating that the analog signal on terminal 24 is larger in absolute magnitude than the signal appearing on lead 27, clock pulses will appear on lead 34 and will be used to step the counters of the converter to a higher value. However, if the polarity of the voltage from the comparator is positive, indicating that the number stored in the register of the converter is larger than the absolute value of the analog signal at terminal 20, then clock pulses appear on lead 36.

While many known circuits may be used for the pulse selector 100, we have developed an improved free-running multivibrator having a period which is substantially independent of the characteristics of the vacuum tubes or transistors used in it. We have found that a modification of this multivibrator may be used as a clock pulse selector and when so used obviates many of the problems presented by prior pulse selectors. An improved comparator circuit utilizing the principles of our improved multivibrator is disclosed in our co-pending application Serial No. 832,040, filed August 6, 1959 which is also assigned to the assignee of this application.

The shift pulses appearing on the lead 36 are used to control the operation of the analog to digital converter, shifting from counter to counter and, when conversion is complete, to stop the operation of the converter until it is started again by another "Start" pulse. All operations of the analog to digital converter are under the control of the register control circuits generally indicated at 42 which determine the proper times for shifting from counter to counter and for stopping the conversion when complete. As shown in the figure, the register control circuits include a static shift register 43, whose outputs are amplified and connected with various gate circuits to control the converter operation. The static shift register has three inputs, "Set to Sign Test" which is the first possible state, "Set to Overload" which is the final state and a "Shift" input. In operation, a pulse is first supplied to the "Set to Sign Test" input and this sets the register to a first state. Subsequent shift pulses fed to the "Shift" input cause the register to shift through subsequent states, each "state" being characterized by the energization of one output lead. A number of well-known counter circuits have been devised for this purpose and might be used in our device. Additionally, an improved counter described in the copending application of F. Mansfield Young and Thomas G. Hagan, filed August 6, 1959, Serial No. 832,038, which is assigned to the assignee of the present invention might also be used in this circuit.

In our converter here illustrated three separate decimal digital counters 44, 46 and 48 are provided. These counters may also utilize any of the well known mechanical, electromechanical or electronic counter circuits, a preferred circuit being that described in the above-identified application. The numbers stored in each of the storage counters 44, 46 and 48 correspond to each of the three digits in a three decimal digit display. The counters 44, 46 and 48 are each connected to precision switches in the analog to digital converter 26 to control the output signal therefrom. It is this output signal which is fed to the error point 24 via lead 27. It is important to note that the digital to analog converter 26 is a bipolar device and by changing the input signal thereto from the sign flip-flop 50 in the comparator 28 (to be hereinafter described) the output of the digital to analog converter can be in either the negative or the positive direction as may be required.

It will be noted also that the output from each of the registers is connected via amplifiers 52, 54 and 56 respectively to a display tube capable of displaying one of the numbers from 0 to 9 depending upon which of its ten input connections is energized. This is the output display. Other output devices may also be connected to the leads from the amplifiers 52, 54 and 56 if desired, using matrices to convert from decimal to other forms of coding if desired.

As an aid in understanding the construction and operation of our improved converter, the apparatus and its operation useful for each of the generally separate functions it performs will be described, these functions occurring in time sequence for each conversion of an analog signal to its digital equivalent. The functions performed and to be described are:

(1) The sign-test.
(2) The overload test.
(3) The actual conversion and ending the conversion.

II.—THE SIGN TEST

As has been indicated, the analog to digital converter of our invention is a bipolar device and the first step which must be performed in any conversion is the determination of the proper sign. The apparatus for performing this function and its operation is as follows.

With an analog input signal connected to the terminal 20 which it is desired to convert, conversion is started by the appearance of an external trigger at the terminal 64 of the clock chassis 40. This external trigger is fed as shown through a pulse generator 66 where it is suitably shaped for use in the converter. It is to be understood of course that an internal oscillator, or other means may be provided for operating the pulse generator 66 if desired. The output of generator 66 is connected via lead 68 and leads branching therefrom to the sign flip-flop 50, to the "Set 0" inputs of each of the counters 44, 46 and 48 and to the input of the static shift counter 43 which sets the register to the "Sign Test" state, its first state. (This is equivalent to applying a pulse to the "Set 0" input of a counter circuit.)

The start pulse is connected to the "Set to +" input of the flip-flop 50 and causes the flip-flop to assume a state where the positive (upper) output terminal is in fact positive and the negative (lower) output terminal is negative as indicated in the drawing. This is the state that the flip-flop 50 should be in if the analog input signal is in fact negative. The outputs of the flip-flop 50 are connected to two AND gates 70 and 72, the outputs of which are connected to an OR gate 74. The output of OR gate 74 appears on the lead 32 which carries the comparator output signal. The two AND gates 70 and 72 and the OR gate 74 all connected as shown constitute a reversing switch whose function will be hereinafter described. For the present it is sufficient to note that with the sign flip-flop 50 in the state where the positive output is in fact positive and the negative output is in fact negative, the reversing switch is set for positive operation i.e. for operation with an analog input signal which is positive with respect to ground, and a polarity inversion occurs between input and output of the comparator.

In addition to setting the sign flip-flop 50 and the reserving switch for positive operation, the start pulse is connected through the OR gates 76, 78 and 80 respectively to the "Set 0" inputs to the counters 44, 46 and 48. This pulse sets each of the counters to its 0 value, and this 0 value in turn sets a 0.000 input to the digital to analog converter 26. Thus a 0.000 signal output is fed from the lead 27 to the error point 24.

By connecting the start pulse to the "Set to Sign Test State" input of the static shift register 43, the register output marked "Sign Test" state is energized. The output signal appearing on the lead 81 is amplified by amplifier 82 and is used to open the AND gate 84 of the register control circuits and additionally AND gates 86 and 88 on the clock chassis 40. The "Sign Test" signal also shuts off the one half unit signal generator 90 associated with the digital to analog converter whose function will be hereinafter described. By shutting off this signal generator, the signal fed to the error point 24 via lead 27 is assured of being exactly 0.000.

Thus, the start pulse accomplishes the following functions: It sets the reversing switch associated with the sign flip-flop 50 for positive operation, sets all the registers to 0 and therefore provides an output signal from the digital to analog converter 26 which is 0. It also sets the register control circuits to the "Sign Test" state which results in the opening of gates 84, 86 and 88 and shuts off the half generator 90.

The analog input signal appearing at the terminal 20 will therefore be unmodified at the summing junction 24 and will be amplified directly by the comparator amplifier 92 on the comparator chassis 26. The output of the comparator amplifier 92 is connected to a phase splitting amplifier 94 which provides both positive and negative outputs whose amplitude is proportional to the comparator amplifier input signal. If the input signal to the phase splitter 94 is negative, then the output lead 96 from the phase splitter is negative and the output lead 98 is positive. The comparator amplifier is designed so that the signal appearing at the error point and the signal appearing at its output are of opposite polarity. Thus, if the analog input signal is positive, the comparator output signal will be negative and the lead 96 will be negative and lead 98 positive.

To understand the operation of the sign selecting circuits it will be assumed that a positive analog signal is present and that the gates 70 and 72 are opened by a positive signal applied to their inputs. With the sign flip-flop set as previously described i.e. the positive signal applied to gate 70, the negative output signal from the phase splitter appearing on the lead 96 resulting from the positive input signal will be passed to the gate or 74 and from there to the comparator output. As previously mentioned, the signal appearing on the lead 96 is a negative one and this negative signal appearing on the output lead 32 of the comparator is connected to the pulse selector 100 on the clock pulse chassis. A negative signal fed to the pulse selector causes the clock pulses to appear on the "step" pulse lead 34. With the converter set in the condition described, the first clock pulse which is fed to the pulse selector 100 will appear on the lead 34 and will be passed by the gate 86, which has been opened by the "Sign Test" signal through the buffer or OR gate 102 and amplifier 103 to the shift input of the static shift register 43. A pulse on the "shift" input to the static shift register causes it to shift from the "Sign Test" state to the "Overload" test state as previously described. This shift closes the gates 86 and 88 and turns on the half unit switch 90 in the digital to analog converter. The pulse generated by this first step pulse from the pulse selector 100 is also connected through the gate 84 which was opened during the "Sign Test" state to the "Set 9" input of each of the counters 44, 46 and 48. This first "step" pulse thus sets each of the registers to their maximum value for the subsequent "Overload" test.

The operation so far described is the situation which would occur if the analog input signal is positive. If however the analog input is negative, the output signals appearing on the leads 96 and 98 from the phase splitter will be reversed in polarity as shown in parenthesis and the lead 96 will be positive. Thus a positive signal will be fed to the pulse selector 100 and this positive signal instead of generating a step pulse from the initial clock pulse fed to the pulse selector will generate a shift pulse on the lead 36. This shift pulse will perform all of the functions performed by the "step" pulse except that it will also be fed via the gate 88, which is open to the "Sign Test" state to the sign flip-flop 50 where it resets it so that the upper lead as seen in the figure becomes negative closing gate 70. The lower lead becomes positive, opening gate 72 and the lead 98 is connected as the comparator output lead. Thus the dependence of the comparator output signal upon the polarity of the difference between the analog input signal and the signal on lead 27 is reversed depending on the setting of sign flip-flop 50. Additionally, the sign flip-flop reset pulse passed by the gate 88 is amplified by the amplifier 106 and is used to reverse the polarity of the digital to analog converter 26 by being fed to the polarity selector input thereof. Thus the output of the analog to digital converter will now be negative to correspond to the negative analog input signal and the connections of the phase splitter to the comparator output are reversed.

In summary, the shift pulse generated when the analog signal input to the comparator is negative during the "Sign Test" state performs all the functions of the "step" pulse generated when the analog input signal is positive except that it resets the sign flip-flop 50 for negative operation and sets the polarity of the digital to analog converter 26 for negative operation.

In this fashion, an analog to digital converter made according to our invention can handle either positive or negative input analog signals with equal facility. It is to be noted that a display indicator 105 is provided having both positive and negative inputs, which are connected to corresponding terminals on the sign flip-flop 50. Thus, the polarity of the conversion is indicated during and after the time it is taking place.

III.—OVERLOAD TEST STATE

Having determined the sign of the input analog signal, before actually making a conversion, it is desirable to determine whether the input signal is within the converter range. By way of example, it will be assumed that the converter shown in the drawing has a 1 volt total range and that each of the digits in the decimal counters 44, 46 and 48 represent respectively tenths, hundredths and thousandths of a volt. This of course is by way of example, and the converter range may be adjusted by changing the digital to analog converter 26 to handle whatever range of input analog signals is desired.

It will be recalled that the shift input pulse which is generated during the "Sign Test" state independent of whether a "step" or a "shift" pulse is generated by the pulse selector, is passed through the open gate 84 to set all the counters 44, 46 and 48 to their maximum value i.e. 9. Thus, the digital to analog converter will be providing a signal corresponding to 0.999 volt. Additionally, the same shift pulse deenergizes the "Sign Test" state of the register control circuit and causes the register to shift to the "Overload Test" state.

The deenergization of the "Sign Test" state removes the shut off signal from the half unit signal generator associated with the digital to analog converter. This unit supplies a signal, corresponding to half of the smallest unit indicated by the register 48 to the digital to analog converter 26 for purposes to be hereinafter explained. Accordingly, the output signal appearing on lead 27 in the "Overload Test" state is actually 0.9995 volt. This signal is connected to the error point 24. For purposes of this discussion, it will be assumed that the analog input signal is a positive, although it is to be understood by reason of the operation described in the previous discussion, that the device would operate in the same manner for a negative signal.

(A) Overload Condition

If the analog signal appearing at the terminal 20 is larger than the maximum signal possible from the device which appears on the lead 27 in the "Overload" state, then a positive signal will appear at the input to the comparator amplifier. A positive signal indicates that the input analog signal is larger than the signal from the digital to analog converter and a "step" pulse on lead 34 will be generated at the next clock pulse. The "step" pulse appearing on lead 34 is amplified by amplifier 104 and applied to the gate 106. The gate 106 has been opened by the shift of the register control circuit to the "Overload Test" state and energization of output lead 108, the signal appearing on lead 108 being amplified by amplifier 109. Thus the "shift" pulse on lead 34 is passed by the gate 106 to the "Set to Overload State" input of the static shift register 43. This pulse steps the register 43 immediately through all intervening steps to the "overload" state and energizes the "Overload" output lead 110 from the register control circuits. The output signal appearing on lead 110 is amplified by amplifier 112 and is fed back via lead 114 through the buffer 116 to the "Stop" input of the clock pulse generator 38. This stops all further clock pulses until the next "Start" pulse is received. The signal appearing on lead 114 may also be connected to an overload indicator if desired. (This indicator is not shown in the drawing for purposes of clarity.)

(B) Non-Overload Condition

If instead of having a signal larger than that supplied by the digital to analog converter 26, a smaller signal is present at the analog input terminal 20, then the input to the comparator amplifier is negative, and the output of the comparator appearing on lead 32 would provide a positive signal to the pulse selector 100. This positive signal directs the next clock pulse to the "shift" lead 36 rather than the "step" lead 34. The "shift" pulse appearing on lead 36 is passed via buffer 102 and amplifier 103 to the "shift" input to the register 43, causing it to step from the "Overload Test" state to the "Step 100's" state. The "shift" pulse is also connected to the gate 118 which has been open in the "Overload Test" state and the pulse passes through gate 118 as a "Set 099" signal. This pulse is connected via lead 119 and buffer 76 to the "Set 0" input to the register 44 and resets this register to 0 preparatory to making the initial conversion.

Thus, in the "Overload Test" state, all the registers are set to their maximum value and the output from the digital to analog converter 26 is compared with the input analog signal. If the input analog signal is larger than the signal fed from the digital to analog converter, a "step" pulse is generated which sets the register control circuits to the overload condition and this in turn stops the operation of the device. If on the other hand a "shift" pulse is generated, indicating that the input signal is smaller in absolute magnitude than the signal fed back from the digital to analog converter 26, and therefore in a range which can be converted, the "shift" pulse steps the static shift register 43 one step farther on in the sequence to the "Step 100's" state and also sets the 100's counter 44 to its 0 value. Thus no conversion is attempted unless in fact the input analog signal is within the range of the converter.

IV.—ACTUAL CONVERSION AND ENDING THE CONVERSION

At the completion of the "Overload" test, if the analog input signal is less than the full scale output of the digital to analog converter 26, the "Step 100's" lead 120 of the register control circuit is energized. The signal appearing on this lead is amplified by the amplifier 122 and opens the AND gates 124 and 126. Additionally the "Step 100's" signal from the static shift register is connected to the AND gate 128 as one of the two input signals to that gate which are required to open it.

With the static shift register 43 in the "Step 100's" state, the analog input signal is larger than the digital to analog converter signal, then the signal appearing on the comparator output lead will be negative; thus, the next clock pulse fed to the pulse selector will appear on lead 34 as heretofore explained. After amplification by amplifier 104, this pulse will be connected as an input pulse to AND gates 106, 124 which have been previously mentioned as well as to AND gates 130 and 132. Since only gate 124 is open by reason of the energization of the "Step 100's" lead 120, the "step" pulse will be passed only by gate 124, and will be applied to the step input of the "100's" counter 44 via lead 133. It will be stored in the counter as 1 and the output signal from the digital to analog converter 26 will increase accordingly. If the analog signal at terminal 20 is still larger than this signal i.e. greater than 0.199, additional "step" pulses will be generated until the output from the digital to analog converter is larger in absolute magnitude than the analog signal.

The importance of the unit 90 which adds a signal to the output of the digital to analog converter 26 equal to half of the signal generated by each of the digits in the 1's counter 48 is apparent at this point. If for example the input analog signal appearing at the input terminal 20 is in fact 0.199, 0.299 . . . 0.999 volts, there would be some ambiguity when this voltage was reached as to whether a shift or a step pulse should be generated. This would result because the signal from the digital to analog converter and the analog input signal are substantially identical. Accordingly, slight perturbations, noise etc. might cause an erroneous pulse to be generated with a resulting inaccuracy in the reading of the converter. To avoid this problem, the signal from the digital to analog converter is always made slightly larger (by one-half of the smallest unit stored in the digital counters) than the analog input signal. Thus, the only time that the condition mentioned can arise is when the analog input signal is half way between one of the smallest units i. e. is actually for example 0.1995 . . . 0.9995 volt. However, under this condition noise or other perturbations which may occur will only cause an error in the final digit. Since the actual number may be represented by the converter equally closely by giving an answer which is either 0.199 volt or 0.200 volt for example, the uncertainty which may result here does not result in any inaccuracy in the representation of the analog input signal by the digital registers.

As the counter 44 is stepped from 0 to 1 to 2 etc. as is required by the analog input signal, the output leads *44a*, *44b*, *44c*, *44d*, etc are energized in turn, and the signal on each of the leads is amplified by the amplifier 52. The outputs of the amplifier 52 are connected to a display tube which displays the appropriate digit stored in the register.

When the output signal from the digital to analog converter is larger than the analog input signal, the clock pulses instead of being connected to the step output 34 of the pulse selector 100 are fed to the "shift" pulse output 36, and the first clock pulse output which appears as a "shift" pulse causes the shift register to step from the "Step 100's" state to the "Step 10" state. This deenergizes lead 120 and energizes lead 134, the signal appearing on lead 134 being amplified by amplifier 136. Additionally, the shift signal is passed by the AND gate 126 as a "Set X09" signal on lead 137 and is applied through the buffer 78 to the "Set 0" input of the counter 46. This sets the counter 46 to 0 preparatory to determining the next digit of the analog input signal. Thus, for example, if the prior output signal from the digital to analog converter which caused a shift signal to be generated was 0.599, the actions which take place when this "shift" pulse is generated change the number stored in the register to 0.509. It will be assumed that the input signal is larger than 0.509 but smaller than 0.599.

The next output pulse from the pulse selector will then be a "step" pulse, and will be applied to the gate 130 which was opened by the energization of lead 134 and will be applied as a step input on the "Step 10's" lead 139 to the step input of the 10's counter 46. The 10's counter will step in order until the digital to analog output signal plus the one half unit from the half unit generator 90 is larger than the analog input signal, when again a "shift" pulse will be generated. The "shift" pulse will be applied to the "shift" input of the static shift register 43 to step the register control circuits from the "Step 10's" state to the "Step 1's" state and energize the lead 140. Additionally, this "shift" pulse will be applied to the gate 138, which was also energized by the energization of lead 134 and will be applied via lead 141 through the buffer 80 to the 1's counter to set that counter to 0. Thus this latter step pulse is a "Set XX0" signal. It will be observed that each "shift" pulse causes the static shift register 43 to move in sequence from one state to the next state, and also, through gates which are opened by energization of the previous state, sets the next digital storage counter to 0 to receive "step" pulses. Thus, gate 132 is opened by the output signal from amplifier 142 when lead 140 is energized, and the "step" pulses from the pulse selector are passed by this gate on the "Step 1's" lead 143 to the "step" input of the register 48.

As each of the counter 46 and 48 count, their outputs are displayed by the display tubes 60 and 62 respectively in the same manner as the output of the register 44 is displayed by the display tube 58. Register signals are fed to the digital to analog converter 26 by a plurality of leads, which are illustrated schematically as the leads 144, 146 and 148 respectively. It will be understood of course that each of the leads 144, 146 and 148 actually represent a cable which contains a number of leads to control the switches in the digital to analog converter 26.

The gate 128 associated with the "Step 100's" state has previously been mentioned. In addition, it will be observed that gates 150 and 152 are similarly associated with the "Step 10's" and "Step 1's" state. Each of these gates has three inputs and they are AND gates. One input to gate 128 is energized in the "Step 100's" state of the converter, one input to gate 150 in the "Step 10's" state of the converter and one input to gate 152 in the "Step 1's" state of the converter. Additionally, the gates are energized by the leads 154, 156 and 158 respectively when the counters 44, 46 or 48 are at their eighth level. If while the counters are at their eighth level a "step" pulse is generated, causing the counter to move from the eighth to the ninth level, this "step" pulse will be connected through the gates 128, 150 and 152 as a "shift" pulse, causing automatic shifting of the static shift register 43 to the next state.

As has been explained, this is necessary in the event that the analog signal changes in value during the course of the conversion. Thus, for each of the counters, the transition from the eighth to the ninth level automatically causes a "shift" pulse and causes counting to begin in the next lower counter. In the case of the "Step 1's" state, this "shift" pulse will cause the static shift register to shift to the "Stop" state as would a "shift" pulse generated while the register control circuits are in the "Step 1's" state. This "Stop" state causes the energization of the lead 160, and through amplifier 162, a signal is applied through buffer 116 to the clock pulse generator 38.

The "Overload" state, the final state shown on the register control circuits, has been previously discussed.

As so far described, our improved analog to digital converter could operate at any speed, and the logical circuits here described would operate equally well. However, we have found that by using electronic components exclusively for registers, stepping circuits, and for a digital to analog converter, an analog to digital converter made according to our invention can make as many as two thousand complete conversions of an input signal per second. The clock pulse generator in a unit of this type operates at a frequency of approximately 60 kilocycles.

Thus we have provided a high speed analog to digital converter utilizing a counter of appropriate number base associated with each digit having relatively simple logic. Our converter is bipolar in its operation, automatically setting itself for the polarity of the input signal. Also, our device automatically tests for overload before beginning each conversion and additionally, provides appropriate logical circuits to insure that conversion ends despite changes in input or noise in the system occurring during conversion.

It will thus be seen that the object set forth above, among those made apparent from the preceding description, are efficiently attained and, since certain changes may be made in our invention as disclosed herein without departing from the scope of the invention, it is intended that all matter contained in the above description or shown in the accompanying drawing shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. An analog to digital converter of the "digit-at-a-time" type which provides digital signals corresponding to the amplitude of an analog input signal, in combination, a digital storage register having a counter capable of representing more than two states for each digit to be represented, a digital to analog converter connected to said digital storage register, said converter providing an analog output signal whose magnitude is proportional to the stored number in said register, means for subtracting said digital to analog converter signal from said analog input signal to form a difference signal, a comparator circuit, means connecting said difference signal as an input signal to said comparator circuit, the output of said comparator circuit being in one of two states dependent upon the polarity of said difference signal, a pulse generator, means connecting the pulses from said pulse generator to one of the counters of said digital storage register to step said counter when said comparator output is in a first state, said comparator output changing state to said second state when said difference signal changes polarity, control means for controlling said converter, and means supplying signals to actuate said control means when said comparator output is in said second state, said control means shifting said pulse source to each of said counters in sequence as said conversion proceeds.

2. The combination defined in claim 1 in which said control means includes means for setting the counter associated with the most significant digit to zero, and the counters associated with less significant digits to their maximum at values at the start of said conversion, and means for setting the counters associated with each less significant digit to zero when the counter associated with the next more significant digit has been set to a value which causes said comparator output to change polarity.

3. An analog to digital converter which provides digital signals corresponding to the amplitude of an analog input signal in response to a start pulse comprising, in combination, a digital storage register, a bipolar digital to analog converter connected to said digital storage register, said converter providing an analog output signal whose magnitude is proportional to the stored number in said register, means for subtracting said digital to analog converter signal from said analog input signal to form a difference signal, a comparator circuit, means connecting said difference signal as an input signal to said comparator circuit, the ouput of said comparator circuit being in one of two states dependent upon the polarity of said difference signal, switching means associated with said comparator for reversing the state dependence of said comparator output signal upon the polarity of said difference signal, a pulse generator, means connecting the pulses from said pulse generator to said digital storage register to step said register when said comparator output is in a first state, said comparator output changing state to said second state when said difference signal changes polarity, signal actuated control means for controlling said analog to digital converter, means supplying signals to actuate said control means when said comparator output is in said second state, said start pulse setting said switching means associated with said comparator for analog input signals of one polarity and said digital storage register to 0, and means responsive to said comparator output for reversing the setting of said switching means and the polarity of said digital to analog converter when the polarity of said switching means does not correspond to the polarity of said analog input signal prior to beginning the conversion of said signal.

4. An analog to digital converter which provides digital signals corresponding to the amplitude of an analog input signal in response to a start pulse comprising, in combination, a digital storage register, a digital to analog converter connected to said digital storage register, said converter providing an analog output signal whose magnitude is proportional to the stored number in said register, means for subtracting said digital to analog converter signal from said analog input signal to form a difference signal, a comparator circuit, means connecting said difference signal as an input signal to said comparator circuit, the output of said comparator circuit being in one of two states dependent upon the polarity of said difference signal, a pulse generator, means connecting the pulses from said pulse generator to said digital storage register to step said register when said comparator output is in a first state, said comparator output changing state to said second state when said difference signal changes polarity, signal actuated control means for controlling said converter, means supplying signals to actuate said control means when said comparator output is in said second state, means responsive to said start pulse for setting said storage register to its maximum value prior to beginning said conversion, and means responsive to said comparator output for stopping the operation of said converter when said register is at said maximum value, if said comparator output is in said first state.

5. An analog to digital converter which provides digital signals corresponding to the amplitude of an analog input signal, in combination, a digital storage register having a counter for each digit to be represented, a digital to analog converter connected to said digital storage register, said converter providing an analog output signal whose magnitude is proportional to the stored number in said register, means for subtracting said digital to analog converter signal from said analog input signal to form a difference signal, a comparator circuit, means connecting said difference signal as an input signal to said comparator circuit, the output of said comparator circuit being in one of two states dependent upon the polarity of said difference signal, a pulse generator, means connecting the pulses from said pulse generator to said digital storage register to step said register when said comparator output is in a first state, said comparator output changing state to said second state when said difference signal changes polarity, control means for controlling said converter, means supplying signals to actuate said control means when said comparator output is in said second state, and means supplying signals to actuate said control means when each of said counters steps from its maximum value less one to its maximum value, said control means thereupon shifting the pulses from said pulse generator to step the counter in said register associated with the next significant digit.

6. The combination defined in claim 5 in which said analog to digital converter provides a decimal digital signal and said digital storage register includes a plurality of decimal counters.

7. An analog to digital converter which provides digital signals corresponding to the amplitude of an analog input signal in response to a start pulse comprising, in combination, a digital storage register, a bipolar digital to analog converter connected to said digital storage register, means connecting said register and said converter whereby said converter provides an analog output signal whose magnitude is proportional to the stored number in said register, means for subtracting said digital to analog converter signal from said analog input signal to form a difference signal, a comparator circuit, means connecting said difference signal as an input signal to said comparator circuit, the output of said comparator circuit being in one of two states dependent upon the polarity of said difference signal, switching means associated with said comparator for reversing the state dependence of said comparator output signal upon the polarity of said difference signal, a pulse generator, means connecting the pulses from said pulse generator to said digital storage register to step said register when said comparator output is in a first state, said comparator output changing state to said second state when said difference signal changes polarity, signal actuated control means for controlling said converter, means supplying signals to actuate said control means when said comparator output is in said second state, said start pulse setting said switching means associated with said comparator for analog input signals of one polarity and said digital storage register to 0, means responsive to said comparator output for reversing the setting of said switching means and the polarity of said digital to analog converter when the polarity of said switching means does not correspond to the polarity of said analog input signal prior to beginning the conversion of said signal, and means for determining whether said analog signal is within said converter range prior to beginning said conversion, said means including means for setting said storage register to its maximum value, means responsive to said comparator output for stopping the operation of said converter when said register is at said maximum value if said comparator output is in said first state.

8. An analog to digital converter which provides digital signals corresponding to the amplitude of an analog input signal in response to a start pulse comprising, in combination, a digital storage register having a counter for each digit to be represented, a bipolar digital to analog converter connected to said digital storage register, said converter providing an analog output signal whose magnitude is proportional to the stored number in said register, means for subtracting said digital to analog converter signal from said analog input signal to form a difference signal, a comparator circuit, means connecting said difference signal as an input signal to said comparator circuit, the output of said comparator circuit being in one of two states dependent upon the polarity of said difference signal, switching means associated with said comparator for reversing the state dependence of said comparator output signal upon the polarity of said difference signal, a pulse generator, means connecting the pulses from said pulse generator to said digital storage register to step said register when said comparator output is in a first state, said comparator output changing state to said second state when said difference signal changes polarity, control means for controlling said converter, means supplying signals to actuate said control means when said comparator output is in said second state, said start pulse setting said switching means associated with said comparator for analog input signals of one polarity and said digital storage register to 0, means responsive to said comparator output for reversing the setting of said switching means and the polarity of said digital to analog converter when the polarity of said switching means does not correspond to the polarity of said analog input signal prior to beginning the conversion of said signal, and means for supplying signals to actuate said control means when each of said counters steps from its maximum value less one to its maximum value, said control means thereupon shifting the pulses from said pulse generator to step the counter associated with the next significant digit.

9. An analog to digital converter which provides digital signals corresponding to the amplitude of an analog input signal in response to a start pulse comprising, in combination, a digital storage register having a counter for each digit to be represented, a digital to analog converter connected to said digital storage register, said converter providing an analog output signal whose magnitude is proportional to the stored number in said register, means for subtracting said digital to analog converter signal from said analog input signal to form a difference signal, a comparator circuit, means connecting said difference signal as an input signal to said comparator circuit, the output of said comparator circuit being in one of two states dependent upon the polarity of said difference signal, a pulse generator, means connecting the pulses from said pulse generator to said digital storage register to step said register when said comparator output is in a first state, said comparator output changing state to said second state when said difference signal changes polarity, signal actuated control means for controlling said converter, means supplying signals to actuate said control means when said comparator output is in said second state, means for determining whether said analog signal is within the range of said converter prior to beginning conversion of said signal, said means including means for setting said storage register to its maximum value, means responsive to said comparator output for stopping the operation of said converter when said register is at said maximum value if said comparator output is in said first state, and means supplying signals to actuate said control means when each of said counters steps from its maximum value less one to its maximum value, said control means thereupon shifting the pulses from said pulse generator to the counter associated with the next significant digit.

10. An analog to digital converter which provides digital signals corresponding to the amplitude of an analog input signal in response to a start pulse comprising, in combination, a digital storage register having a counter for each digit to be represented, a bipolar digital to analog converter connected to said digital storage register, means connecting said register and said converter whereby said converter provides an analog output signal whose magnitude is proportional to the stored number in said register, means for subtracting said digital to analog converter signal from said analog input signal to form a difference signal, a comparator circuit, means connecting said difference signal as an input signal to said comparator circuit, the output of said comparator circuit being in one of two states dependent upon the polarity of said difference signal, switching means associated with said comparator for reversing the state dependence of said comparator output signal upon the polarity of said difference signal, a pulse generator, means connecting the pulses from said pulse generator to said digital storage register to step said register when said comparator output is in a first state, said comparator output changing state to said second state when said difference signal changes polarity, control means for controlling said converter, means supplying signals to actuate said control means when said comparator output is in said second state, said start pulse setting said switching means associated with said comparator for analog input signals of one polarity and said digital storage register to 0, means responsive to said comparator output for reversing the setting of said switching means and the polarity of said digital to analog converter when the polarity of said switching means does not correspond to the polarity of said analog input signal prior to beginning the conversion of said signal, means for determining whether said analog signal is within said converter range prior to beginning said conversion, said means including means for setting said storage register to its maximum value, means responsive to said comparator output for stopping the operation of said converter when said register is at said maximum value if said comparator output is in said first state, and means supplying signals to actuate said control means when each of said counters steps from its maximum value less one to its maximum value, said control means thereupon shifting the pulses from said pulse generator to step the counter in said register associated with the next significant digit.

11. An analog to digital converter which provides a digital display corresponding to an analog input signal comprising, in combination, a pulse actuated digital storage register said register including a plurality of digital counters, a digital to analog converter, means connecting said digital to analog converter to said digital storage register whereby said digital to analog converter provides an analog signal whose magnitude is proportional to the number stored in said register, means for subtracting said digital to analog converter output signal from said analog input signal to form a difference signal, a comparator circuit, means connecting said difference signal as an input to said comparator circuit, the output polarity of said comparator circuit signal being dependent upon the polarity of said difference signal, a pulse selector having a pair of output leads, a pulse generator, means connecting the pulses generated by said pulse generator to said pulse selector, means connecting said comparator output signal to said pulse selector, said pulses from said pulse generator appearing on a first of said pulse selector output leads for a first polarity of said comparator output signal, and said pulses appearing on a second of said pulse selector leads for a second polarity of said comparator output signal, a static shift register having a plurality of output leads, each of said leads being energized in turn in response to pulses fed to said shift register input terminal, normally closed gate circuits associated with said output leads, said gate circuits being opened by energization of said output leads, means feeding pulses appearing on the first of said pulse selector output leads to cause selective energization of said shift register output leads, pulses appearing on said second pulse selector output lead being fed through said gate circuits selectively opened by selective energization of said shift register output leads to one of said digital counters in said digital storage register, whereby each of said counters is stepped in turn to the digit representative of said analog signal.

12. The combination defined in claim 11 which includes means for setting each counter associated with less significant digits than the digit associated with the counter then being stepped to its maximum value.

13. An analog to digital converter which provides a digital display corresponding to an analog input signal in response to a start pulse comprising, in combination, a pulse actuated digital storage register said register including a plurality of digital counters, a bipolar digital to analog converter, means connecting said digital to analog converter to said digital storage register whereby said digital to analog converter provides an analog signal whose magnitude is proportional to the number stored in said register, means for subtracting said digital to analog converter output signal from said analog input signal to form a difference signal, a comparator circuit, means connecting said difference signal as an input to said comparator circuit, the output polarity of said comparator circuit signal being dependent upon the polarity of said difference signal, switching means associated with said comparator for reversing the state dependence of said comparator output signal upon the polarity of said difference signal, a pulse selector having a pair of output leads, a pulse generator, means connecting the pulses generated by said pulse generator to said pulse selector, means connecting said comparator output signal to said pulse selector, said pulses from said pulse generator appearing on a first of said pulse selector output leads for a first polarity of said comparator output signal, and said pulses appearing on a second of said pulse selector leads for a second polarity of said comparator output signal, a static shift register having a plurality of output leads each of said leads being energized in turn in response to pulses fed to said shift register input terminal, normally closed gate circuits associated with said output leads, said gate circuits being opened by energization of said output leads, means feeding pulses appearing on the first of said pulse selector output leads to cause selective energization of said shift register output leads, pulses appearing on said second pulse selector output lead being fed through said gate circuits selectively opened by selective energization of said shift register output leads to one of said digital counters in said digital storage register, whereby each of said counters is stepped in turn to the digit representative of said analog signal, means responsive to said start pulse for setting said switching means to correspond to a first polarity of analog input signal, means responsive to said start pulse for setting said digital storage register to zero, and means responsive to said start pulse for setting said digital to analog converter to correspond to said first polarity of analog input signal, and means for reversing said switching means and the polarity of said digital to analog converter if said first clock pulse following said start pulse appears on the first of said pulse selector output leads.

14. An analog to digital converter which provides a digital display corresponding to an analog input signal in response to a start pulse comprising, in combination, a pulse actuated digital storage register said register including a plurality of digital counters, a digital to analog converter, means connecting said digital to analog converter to said digital storage register whereby said digital to analog converter provides an analog signal whose magnitude is proportional to the number stored in said register, means for subtracting said digital to analog converter output signal from said analog input signal to form a difference signal, a comparator circuit, means connecting said difference signal as an input to said comparator circuit, the output polarity of said comparator circuit signal being dependent upon the polarity of said difference signal, a pulse selector having a pair of output leads, a pulse generator, means connecting the pulses generated by said pulse generator to said pulse selector, means connecting said comparator output signal to said pulse selector, said pulses from said pulse generator appearing on a first of said pulse selector output leads for a first polarity of said comparator output signal, and said pulses appearing on a second of said pulse selector leads for a second polarity of said comparator output signal, a static shift register having a plurality of output leads, each of said leads being energized in turn in response to pulses fed to said shift register input terminal, normally closed gate circuits associated with said output leads, said gate circuits being opened by energization of said output leads, means feeding pulses appearing on the first of said pulse selector output leads to cause selective energization of said shift register output leads, pulses appearing on said second pulse selector output lead being fed through said gate circuits selectively opened by selective energization of said shift register output leads to one of said digital counters in said digital storage register, whereby each of said counters is stepped in turn to the digit representative of said analog signal, and means responsive to said start pulse for testing said analog signal to determine whether it is within the conversion range of said converter, said testing means including means for setting said storage register to its maximum value, means for stopping said conversion if the clock pulse following said register setting appears on the second of said pulse selector leads and means for resetting said register for normal conversion if said next following clock pulse appears on the first of said pulse selector output leads.

15. The combination defined in claim 11 which includes means associated with each of said counters for generating a pulse as said counter is stepped from its next to maximum value to its maximum value, and means connecting said pulses to said shift register to cause energization of the next shift register output lead to be energized.

16. An analog to digital converter which provides a digital display corresponding to an analog input signal in response to a start pulse comprising, in combination a pulse actuated digital storage register said register including a plurality of digital counters, a bipolar digital to analog converter, means connecting said digital to analog converter to said digital storage register whereby said digital to analog converter provides an analog signal whose magnitude is proportional to the number stored in said register, means for subtracting said digital to analog converter output signal from said analog input signal to form a difference signal, a comparator circuit, means connecting said difference signal as an input to said comparator circuit, the output polarity of said comparator circuit signal being dependent upon the polarity of said difference signal, switching means associated with said comparator for reversing the state dependence of said comparator output signal upon the polarity of said difference signal, a pulse selector having a pair of output leads, a pulse generator, means connecting the pulses generated by said pulse generator to said pulse selector, means connecting said comparator output signal to said pulse selector, said pulses from said pulse generator appearing on a first of said pulse selector output leads for a first polarity of said comparator output signal, and said pulses appearing on a second of said pulse selector leads for a second polarity of said comparator output signal, a static shift register having a plurality of output leads each of said leads being energized in turn in response to pulses fed to said shift register input terminal, normally closed gate circuits associated with said output leads, means feeding pulses appearing on the first of said pulse selector output leads to cause selective energization of said shift register output leads, pulses appearing on said second pulse selector output lead being fed through said gate circuits selectively opened by selective energization of said shift register output leads to one of said digital counters in said digital storage register, whereby each of said counters is stepped in turn to the digit representative of said analog signal, means responsive to said start pulse for setting said switching means to correspond to a first polarity of analog input signal, means responsive to said start pulse for setting said digital storage register to zero, means responsive to said start pulse for setting said digital to analog converter to correspond to said first polarity of analog input signal, means for reversing said switching means and the polarity of said digital to analog converter if said first clock pulse following said start pulse appears on the first of said pulse selector output leads, and means for testing said analog input signal to determine whether it is within the range of said converter, said testing means including means responsive to the completion of the setting of said switching means for setting said storage register to its maximum value, means for stopping said conversion if the clock pulse next following said register setting appears on the second of said pulse selector leads and means for resetting said register for conversion if said next following clock pulse appears on the first of said pulse selector output leads.

17. The combination defined in claim 13 which includes means associated with each of said counters for generating a pulse as said counter is stepped from its next to maximum value to its maximum value, and means connecting said pulses to said shift register to cause energization of the next shift register output lead to be energized.

18. The combination defined in claim 14 which includes means associated with each of said counters for generating a pulse as said counter is stepped from its next to maximum value to its maximum value, and means connecting said pulses to said shift register to cause energization of the next shift register output lead to be energized.

19. The combination defined in claim 15 which includes means associated with each of said counters for generating a pulse as said counter is stepped from its next to maximum value to its maximum value, and means connecting said pulses to said shift register to cause energization of the next shift register output lead to be energized.

20. The combination defined in claim 5 which includes means for adding to said digital to analog converter signal a signal equal in amplitude to one-half the change in signal generated by said digital to analog converter for a change of one count in the counter associated with the least significant digit in said digital storage register.

References Cited in the file of this patent

UNITED STATES PATENTS 2,836,356 Forrest ______________ May 27, 1958